United States Patent [19]

Alexander et al.

[11] Patent Number: 5,734,988
[45] Date of Patent: *Mar. 31, 1998

[54] METHOD AND APPARATUS FOR THE INJECTION DISPOSAL OF SOLID AND LIQUID WASTE MATERIALS INTO SUBPRESSURED EARTH FORMATIONS PENETRATED BY A BOREHOLE

[76] Inventors: Albert H. D. Alexander; W. Thomas Ballatine; Leland D. Lakey; Frank L. Lyon, all of 3850 N. Causeway, Suite 1770, Metairie, La. 70002; Stephen A. Marinello, 308 Winchester Cir., Mandeville, La. 70448

[*] Notice: The term of this patent shall not extend beyond the expiration date of Pat. No. 5,589,603.

[21] Appl. No.: 606,201

[22] Filed: Feb. 23, 1996

Related U.S. Application Data

[63] Continuation-in-part of Ser. No. 294,250, Aug. 22, 1994, Pat. No. 5,589,603.

[51] Int. Cl.⁶ .................................. B09B 1/00; B09B 3/00
[52] U.S. Cl. ........................ 588/250; 166/305.1; 405/128
[58] Field of Search ........................... 166/305.1; 175/66, 175/206; 405/128, 266; 588/250

[56] References Cited

U.S. PATENT DOCUMENTS

| | | | |
|---|---|---|---|
| 4,482,459 | 11/1984 | Shiver | 210/639 |
| 4,942,929 | 7/1990 | Malachosky et al. | 175/66 |
| 5,108,226 | 4/1992 | Jennings, Jr. | 405/128 |
| 5,129,469 | 7/1992 | Jackson | 175/66 |
| 5,133,624 | 7/1992 | Cahill | 405/128 |
| 5,191,157 | 3/1993 | Crocker | 588/250 |
| 5,226,749 | 7/1993 | Perkins | 405/128 |
| 5,310,282 | 5/1994 | Voskamp | 405/128 X |
| 5,310,285 | 5/1994 | Northcott | 588/250 |
| 5,314,265 | 5/1994 | Perkins et al. | 405/128 |
| 5,405,223 | 4/1995 | Sirevag | 405/128 |
| 5,405,224 | 4/1995 | Aubert et al. | 405/128 |
| 5,502,267 | 3/1996 | Aubert | 588/250 |
| 5,589,603 | 12/1996 | Alexander et al. | 588/250 |

*Primary Examiner*—George A. Suchfield
*Attorney, Agent, or Firm*—Gunn & Associates, P.C.

[57] ABSTRACT

Methods and apparatus for the disposal of solid particulate material in subterranean formations penetrated by a borehole are disclosed. The invention includes, but is not limited to, the disposal of oil field waste and therefore provides means and methods for the disposal of virtually any type of waste slurry stream. A slurry is formed at the surface of the earth by mixing the solid waste in particulate form with liquid and preferably a viscosifier thereby forming a slurry. A borehole is drilled into a selected injection formation and the slurry is pumped or flowed "on vacuum" from the surface through the borehole and into the injection formation. Some surface pretreating of the slurry may be required including sizing of the particulate solids, adding weighting material, removing excessive amounts of oil and grease and diluting to reduce the level of radioactivity. The injection formation is preferably underpressured, highly permeable, highly porous, and dipping in angle with respect to the horizontal and highly fractured. The borehole is hydraulically isolated from intervening earth strata between the surface of the earth and the injection formation.

50 Claims, 3 Drawing Sheets

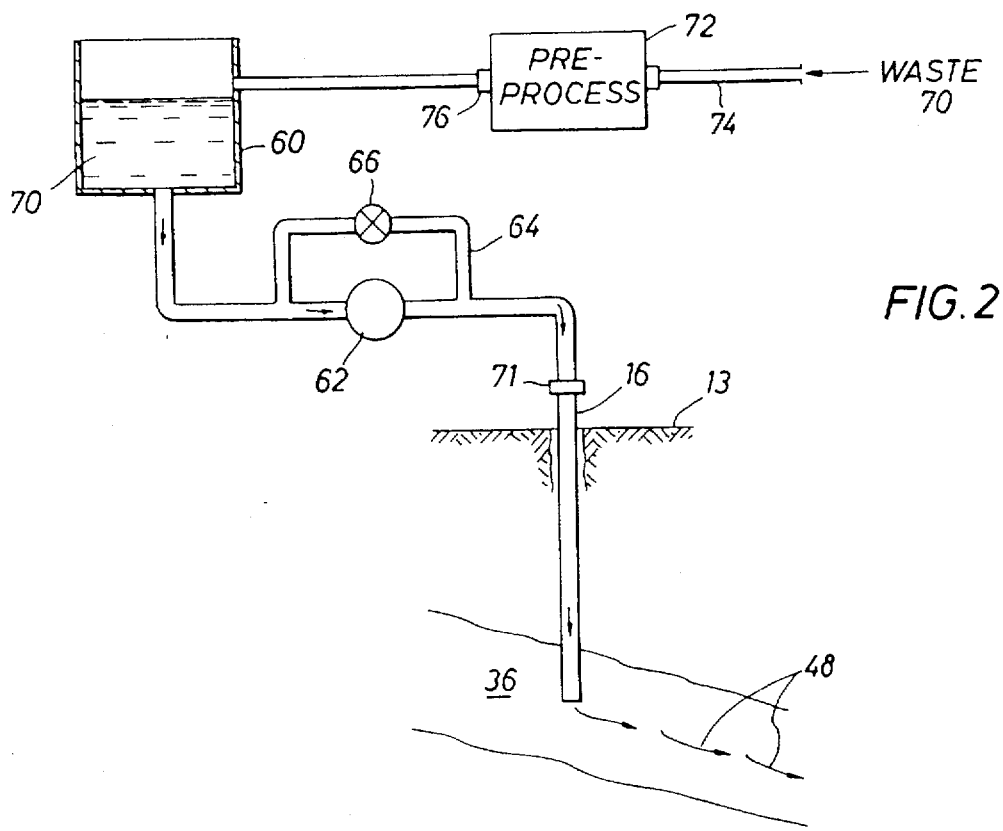
FIG. 2
FIG. 3
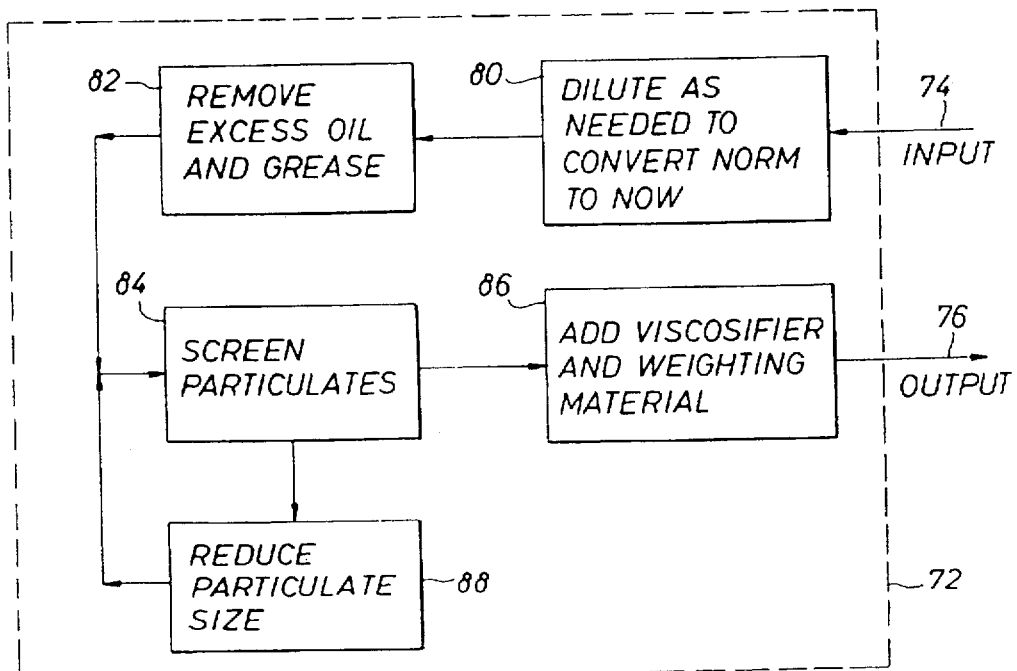

METHOD AND APPARATUS FOR THE INJECTION DISPOSAL OF SOLID AND LIQUID WASTE MATERIALS INTO SUBPRESSURED EARTH FORMATIONS PENETRATED BY A BOREHOLE

This is a Continuation-in-Part of application Ser. No. 08/294,250 which was filed on Aug. 22, 1994, now U.S. Pat. No. 5,589,603 and which is assigned to the assignee of the present disclosure.

BACKGROUND OF THE INVENTION

1. Field of the Invention

This invention is directed toward the disposal of solid and liquid waste material, and more particularly to the disposal of solid and liquid waste material in a subpressured, underground earth formation which has been penetrated by a borehole.

2. Background of the Art

In disposing solid waste, the two major categories are surface or near surface disposal, and subsurface disposal. Surface disposal includes landfills or land farming operations, and subsurface disposal herein applies to underground disposal utilizing injection wells. In using either of these methods, one of the main concerns is the protection of underground sources of drinking water (USDW).

Solid waste disposal into landfills requires that the waste be of a certain moisture content and that it be sufficiently stabilized to pass testing procedures for leachibility and other properties to determine any hazardous characteristics. Testing and stabilization add to the basic cost of disposal. There is also the inherent danger that any USDW will be contaminated by seepage or leakage of the disposed waste above. Landfarming operations are utilized to detoxify particular kinds of solid waste, be they municipal, industrial or oil and gas industry derived waste. In any such application, the use of added nutrients, such as fertilizers, accelerates the natural process of biodegradation in order to render the waste benign. Problems have been found in specific cases with heavy metal contaminants concentrated in some of the traditional landfarm waste streams, such as municipal water processing plant sludges. These do not degrade and must be bound up utilizing some sort of chemical exchange if the product is to be rendered completely benign. Both of these surface or near surface operations, when properly managed, are operated to minimize the possibility of ground water or off site contamination. However, as the ground water is still, by definition, below these operations, the possibility of future contamination, and accompanying liability, exists.

Injection well operations can be designed to inject fluids into the downhole formations directly or through fractures created or induced in the formations. Each formation has a "fracture pressure" or "threshold" at which the formation will part. The injected fluid then travels into the formation by way of the path of least resistance, namely the fracture, and the fluid bleeds off into the formation through the walls of the fracture. In slurry injection, the solids of the slurry are placed into the volume of the open fracture and are held there after slurry injection is terminated, or, alternately, the solids intermingle with the formation solids in a "dissolution" fracture scenario and likewise move out into the formation until they are held in place following a reduction in pressure when the slurry injection ceases. The volume of waste that can be disposed of in a given well using this induced fracture methodology is limited to that which can be pumped into the formation during the fracturing operation. Further waste disposal or injection in such a well is improbable due to the difficulty in reinitiating the fracture. For long term fracture, particularly with respect to the dissolution scenario, the concern is with continuing extension of the fracture or the fracture system increasing the risk of losing control of the waste, such as impacting other wells or aquifers in the vicinity of the injection well. This concern is in addition to concerns regarding the suspension and carrying of the wastes over an extended term.

In either of the above cases, the injection pressure must be great enough to overcome the formation pressure to induce formation fracturing. Due to the induced pressures required and to the fact that fractures are not considered highly controllable, regulatory agencies are somewhat averse to disposal of waste streams, suspended solids, or otherwise, into wells in which fractures have been induced in the injection formation. More specifically, there is concern that the induced fractures may rise vertically to the extent that they will penetrate to the USDW or to a conductive zone through which the contamination potential is significantly increased, or that they will extend laterally to where fractures may intersect another well bore that might allow communication with the USDW. There are two pathways of concern through which this could occur. The first pathway is through damage caused to, or existing weakness in, the seal existing in the intersected borehole. Under this scenario, the disposed waste stream would contaminate the USDW by flowing "behind casing" in the intersected borehole. The second pathway is again through the intersected borehole in the event that it is an abandoned borehole that was not plugged and abandoned properly. For these reasons, regulatory agencies administering Class II injection wells specify a maximum surface injection pressure (MASIP) capable of protecting the integrity of the disposal zone. Often, the pressure maximum at the surface can be low so that downhole pressure is below a defined maximum pressure. This is below formation fracture pressure.

Fluid can also be injected into non-fractured formations. For injection and disposal under the non-fractured scenario, it is required that the formation be able to take and transport the injected fluids and/or slurries within the existing porous matrix. If a relatively simple fluid such as produced oilfield brine is to be injected, there are innumerable Class II injection wells that are and can be permitted to handle such fluids. With increasing viscosity of the injected fluid, increasing permeability of the disposal formation is required. If solids in suspension are to be injected, the requirement is that the formation and pore size distribution is such that the solids can enter or can be forced into the matrix. Higher injection pressures would be required to force the solids into the formation. But when considering the protection of the USDW, it is required that the injection pressure be limited to that which can be shown not to induce fracturing in the disposal zone. This would activate the previously mentioned concerns about fractured wells and fractures traveling to other zones or well bores. It would also severely limit the allowable size of the suspended waste particles for typical injection into sandstone or limestone disposal zones.

Earth formations do exist in which the permeability and porosity are high enough to allow transport of slurried solids. In most cases, the injection pressure required is still a problem due to the viscosity of such slurries. The problem of downhole injection pressure and the disposal of slurried waste can be reduced, however, if the target zone is underpressured relative to the existing hydrostatic gradient.

Attention is now directed to a particular type of waste, namely, waste generated in the drilling and producing of oil and gas wells. This type waste derives from a variety of typical oil field sources. This type of waste will be used to examine further the background of the art. The process used in the drilling of most oil and gas wells involves the use of a drilling fluid commonly referred to as drilling "mud" in the industry. The mud is injected under pressure through the drill string during drilling and returns to the surface through the drill string-borehole annulus. The mud performs multiple functions which include cooling of the drill bit, lubrication of the drill bit, providing a means of returning the drill cuttings to the surface of the earth and providing hydrostatic pressure to prevent the "blowout" of high pressure geologic zones when such zones are penetrated by the drill bit. Drilling mud comprises a liquid phase and a suspended solid phase. The liquid phase can be either fresh or saline water or even an oil base. The solid phase, which is suspended within the liquid phase, can comprise a multitude of materials blended to meet the particular needs at hand. As an example, barite (barium sulfate), with a specific gravity over 4.0, is often used as a weighting constituent to increase the bulk density of the mud when high pressure formations are being penetrated. Other additives are used to control drilling fluid circulation loss when certain types of high porosity, low pressure formations are penetrated. Once returned to the surface, the drilling fluid contains cuttings from the drill bit. Although most large cuttings are removed at the surface prior to recirculating the mud, smaller sized particles remain suspended within the drilling mud. Upon completion of the drilling operation, the drilling mud can sometimes be reconditioned and used again. Eventually, however, the mud can no longer be reprocessed and becomes classified as a waste product of the drilling operation.

Once the well has been successfully drilled and cased, hydrocarbons are extracted or produced from one or more formations penetrated by the borehole. Although hydrocarbons are the primary production fluids of interest, other nonhazardous oilfield waste (NOW) is usually generated in the production of hydrocarbons. A water component is usually produced along with the hydrocarbon component, and in most areas of the world, the produced waters are saline. Although there are some secondary uses for produced waters, these waters are in general considered a waste product of the production operation. Solid wastes including sand, paraffin, sludges and other solid materials are also generated during the production operations. Large quantities of these solid wastes have been accumulated for decades in production pits. Environmental regulations have led to the need for disposal solutions for the materials contained in production pits undergoing remediation to acceptable environmental levels.

The isotopes uranium-238 and thorium-232, and the radioactive isotopes associated with the decay series of these isotopes, occur in nature in earth formations. In situ, the activities associated with these decay chains are relatively low and do not present a radiation hazard during the drilling operation. During well production, however, these naturally occurring radioactive materials (NORM) are dissolved in the produced waters and are transported to the surface. Over an extended period of time, the NORM becomes concentrated in precipitated scale associated with tubulars and surface equipment such as heater treaters, wellheads, separators and salt water tanks. Although the parent isotopes uranium-238 and thorium-232 are not generally present, the decay products or "daughter" products radium-226, radium-228, radon-222 and lead-210 can be found in oilfield waste. Radium-226, which coprecipitates with carbonates and sulfates of calcium, barium and strontium, is by far the greatest source of radioactive waste resulting from production activities. Once atoms of radium have replaced a sufficient number of atoms of the elements normally found in NOW waste to exceed a specified regulatory level, the waste is classified as NORM. Stated another way, there is no difference between NOW and NORM waste other than the level of radioactivity, which usually results from the radium content of NORM waste.

In summary, the drilling and production of oil and gas wells generates much waste. The wastes are classified as nonhazardous oilfield waste (NOW) and naturally occurring radioactive materials (NORM). NOW originating from drilling and production operations is primarily composed of drill cuttings, sand and spent material such as drilling mud which is no longer suitable for use and must be managed as waste under regulatory authority. Such mud might contain salts, non-toxic metals such as sodium and calcium, toxic metals such as barium, chromium, lead, zinc and cadmium, and oil and grease contamination from the introduction of diesel oil (oil based mud), crude oil or a multitude of hydrocarbon based additives. The spent mud, with associated contaminants, comprises a liquid and a solid phase. NOW is also generated in production operations where copious amounts of saline water, along with some solids (sand), may be produced with the desired hydrocarbons. NORM originates primarily from production operations wherein the previously described radioactive scale contaminates not only large pieces of hardware such as well heads and separators but also can contaminate produced "waste" fluids such as salt water and associated solids. It is necessary to dispose of all types of waste, including those previously stored in pits, in a manner which will not contaminate the surface of the earth and not contaminate subterranean aquifers used as sources of drinking water.

As discussed previously, there are surface or near surface disposal means, and subsurface disposal means for the disposal of both NORM and NOW material. Other oil field wastes are often stored, either temporarily or longer, in such pits or portable containers.

Present surface and near surface disposal means will first be examined. Oil and grease toxicity in NOW can be lowered by dilution techniques. Organics can be converted biologically to less toxic forms. Organics can also be removed by extraction processes. These extraction processes can utilize heat and may include methods such as thermal desorption or incineration. Oils can be removed by separation techniques and possibly produce a byproduct of commercial value. Organics can also be bound to solids thereby reducing their leachability and hazard to drinking water supplies. Salts can be diluted and discharged, chemically destroyed or rendered insoluble. Heavy metals can neither be biologically or chemically changed into less toxic species, therefore dilution with non-contaminated materials is one method of controlling possible hazardous pollution. Heavy metals can be bound chemically thereby rendering them immobile and nonleachable into the environment. NORM can not be destroyed or chemically altered, therefore dilution with essentially non-radioactive material to prescribed levels is an acceptable method. All of the above steps are necessary if the waste material is to be disposed of using present surface or near surface disposal means. It is apparent that such "preprocessing" can add significantly to the costs of disposal and, as mentioned previously, underlying USDW can still be at risk.

If present subsurface injection means of disposal are employed, numerous criteria discussed previously must be met. Among these criteria are defined geologic conditions surrounding the injection well, proper casing and cementing of wells penetrating the injection zone, a MASIP, and specific procedures for periodic testing and reporting to various regulating agencies. Sometimes, good (meaning conventional) engineering practices will define the pipe schedule, number of strings, amount of casing, etc.; sometimes, the casing and pipe requirements are defined by regulations of the states. These vary dependent on regulation. Furthermore, current injection technology requires that the particle size of the solid phase of any slurry first be minimized before injection. This is to prevent clogging or "sanding" of the perforations opposite the injection zone and also to prevent the filling of pore space throats of the injection zone thereby reducing permeability. Processing time and cost must be incurred, and the large particle size solid component of the slurry must still be disposed of in an environmentally acceptable manner. The meeting of all of the above criteria greatly increases the cost and time required to dispose of oilfield waste in underground disposal formations.

An objective of the present invention is to provide means for disposing of waste material in underground formations penetrated by a borehole. A further objective of the invention is to provide means for disposing of slurried waste in an underground formation. A still further objective of the invention is to permit the disposal of waste fluid within a disposal formation by injecting the fluid at a pressure below the fracture pressure of the formation. A further object of the invention is to permit disposal of a waste fluid within a disposal formation by injecting the fluid at a pressure below the MASIP. A still further object of the invention is to establish selection criterion for locating subpressured or underpressured disposal formations in which waste fluids can be flowed under the force of gravity. The selection criteria assures that the downhole injection pressure does not exceed the disposal formation fracture pressure. Low pressure surface operation coupled with down hole pressures below fracture enable long term use to inject a great variety of waste materials. A yet further object of the invention is to provide means and methods for pretreating waste slurries such that they can be optimally flowed or pumped into underground disposal formations. There are other objects of the invention which will become apparent in the following disclosure.

SUMMARY OF THE INVENTION

The present invention is directed toward methods and apparatus for the disposal of both solid and liquid constituents of waste slurry by injection into subterranean formations which are preferably naturally fractured, preferably subpressured, and which are preferably inclined from the horizontal plane or "dipping".

The selection of the zone or formation into which the slurry will be injected is of prime importance. The injection formation should preferably exhibit high permeability and porosity. Furthermore, it is necessary that the borehole is adequately cased and cemented (as required) within and above the injection formation. The casing and cement should be sufficient to ensure injection zone isolation so that leakage to another zone does not occur. Zone isolation is one aspect of well use and regulation. Any pressure induced on the zone due to the pumping or flowing of liquid or slurry being injected therein should dissipate very quickly such that the pressure at the injection point will not increase enough to induce fracturing. Likewise, the pressure within the disposal zone surrounding the well should not increase, within specific zone related parameters, to such a degree that the overall disposal zone could become pressured up. The injection zone preferably contains an interconnected network of natural, dipping fractures or is "rubbleized". This will define a network of secondary fractures providing waste storage volume. This may include naturally occurring fractures. Furthermore, the injection zone is preferably subpressured. The last two parameters allow the injection formation to "take" slurries containing a high percentage of relatively large grain size solid material, with minimal or even no injection pressure (at the surface) being applied at the surface of the earth. Such zones can be found at the flanks of salt dome structures as will be detailed in a subsequent section.

The injection well can be drilled specifically to the injection zone, or an existing well which penetrates a suitable injection formation can be modified to meet injection well standards. Well completion procedures are believed well known. Current and proposed regulations require that the injection tubular of an injection well passing through an USDW be surrounded by two additional strings of casing, and that all tubular-borehole annuli be properly cemented for hydraulic isolation purposes. Compliance both with good production practices and regulatory agencies is desirable. Tubulars are plugged at the lower vertical extent of the injection formation. The upper vertical extent of the injection formation is isolated by using a packer or other suitable means. Current practice is to first perforate only the lower portion of the injection zone. Should these perforations become plugged over the life of the injection operation, the injection formation can be perforated "up hole".

Some preparation of the slurry at the earth surface is usually necessary prior to injection. Preliminary screening of the solid particulate material is desirable if the slurry is thought to contain large particulates. As an example, large pieces of cuttings in spent drilling fluids are removed from the slurry, pumped through some type of grinding or shearing equipment, and returned to the slurry only after their size has been reduced so that they pass through the screen of predetermined size. Particulate material can be classified as NOW or NORM type. Processing leading to dilution may be required by regulations affecting the specific injection well. Viscosifiers are used to aid in the suspension of the particulate material in the slurry. The viscosifier can be a naturally occurring clay mineral such as virgin bentonite with a specific gravity of ~2.7. Montmorillonite is a specific example of the viscosifier. This type of viscosifier also adds weight to the slurry which assists in the injection process as will be described later. Virgin barite (barium sulfate) or other weighting material can also be used. Man-made materials such as polymers can also be used as viscosifiers. In an alternate embodiment, products from surface recycling of NOW can also be used as a viscosifier, weighting agent, and diluent thereby recycling this NOW waste stream. Specific materials from oil field and other waste streams can be injected when now recycled. Stated another way, byproduct generated by one waste processing method may be used as a key ingredient in a second waste disposal means.

Surface preprocessing can also be used on slurries containing relatively large concentrations of oil or grease. These components can be removed, or the concentrations reduced substantially, by using well known skimming and separation techniques.

It has been determined that the slurry, processed and suspended with viscosifiers as outlined previously, flows into the selected injection formation with no clogging of the fractures or available pore space. This is because the effective porosity of the injection formation is dominated by secondary porosity of a vugular nature, and often includes networked or interconnected fractures or is preferably in the form of rubbleized conduits. The processed and suspended particulate material within the slurry are directed through the injection formation without clogging at pressures well below the formation fracture pressures. Since the injection formation is usually dipping from the horizontal or has adequate vertical thickness and the injected slurry is weighted as previously discussed, flow is maintained with minimal pump or preferably no pump pressure at the surface thereby reducing the costs of pumping and reducing the risk of damaging the hydraulic seals of the well, and virtually eliminating the possibility of inducing fracturing within the formation. Gravity forces acting on the waste stream pull it "down" and into the formation through the porous pathways. Experience has shown that with all other conditions being equal, the required injection pressure decreases as a function of the increasing dip of the injection zone. Operational experience has also shown that for underpressured or sub-pressured injection zones combined with an appropriately weighted slurry, the slurry easily flows into these zones under the hydrostatic pressure head of the slurry column. Operational practice, however, sometimes maintains at least a nominal pump pressure for effective injection rates. The importance of low injection pressures is again emphasized in that pumping costs are reduced, the risk of damage to the well tubulars and cement sheaths are nil, and injection pressures are well below the fracture pressure of the injection formation.

In summary, methods and apparatus are presented for the disposal of waste slurry containing both liquids and solids by injecting this slurry into a subterranean formation through an injection well. The injection formation is selected to be preferably dipping, or has significant vertical thickness enabling downward flow highly porous and permeable formation which is highly vugular thereby permitting the passage of the solid constituent of the slurry. Such formations can be found on the flanks of salt dome formations having the form of thick, relatively horizontal bedded carbonates or similar strata having similar porosity, permeability and zone isolation. Viscosifier is preferably added to the slurry to (a) assist in suspending the solid particulate material and (b) add weight to the slurry thereby minimizing or eliminating the need for injection pumping requirements. Weighting material can also be added independently. If the slurry contains NORM, processing at the surface may be required to reduce the concentration of NORM to levels consistent with that permitted for the specific injection well being utilized. Processing may also be necessary to reduce the size of the particulates prior to injection. Furthermore, some preliminary skimming or separating at the surface of an abnormally high concentration of oil or grease may be required.

BRIEF DESCRIPTION OF THE DRAWINGS

So that the manner in which the above cited features, advantages and objects of the present invention are attained and can be understood in detail, a more particular description of the invention, briefly summarized above, may be had by reference to the embodiments thereof which are illustrated in the appended drawings. It is noted, however, that the appended drawings illustrate only typical embodiments of this invention and are therefore not to be considered limiting of its scope, for the invention may admit to other equally effective embodiments.

FIG. 2 is a schematic diagram of the surface apparatus and processes cooperating with an injection well which penetrates the injection formation;

FIG. 3 depicts in block diagram form the preprocessing steps for the injected slurry prior to injection;

DETAILED DESCRIPTION OF THE PREFERRED EMBODIMENT

Figure 1:
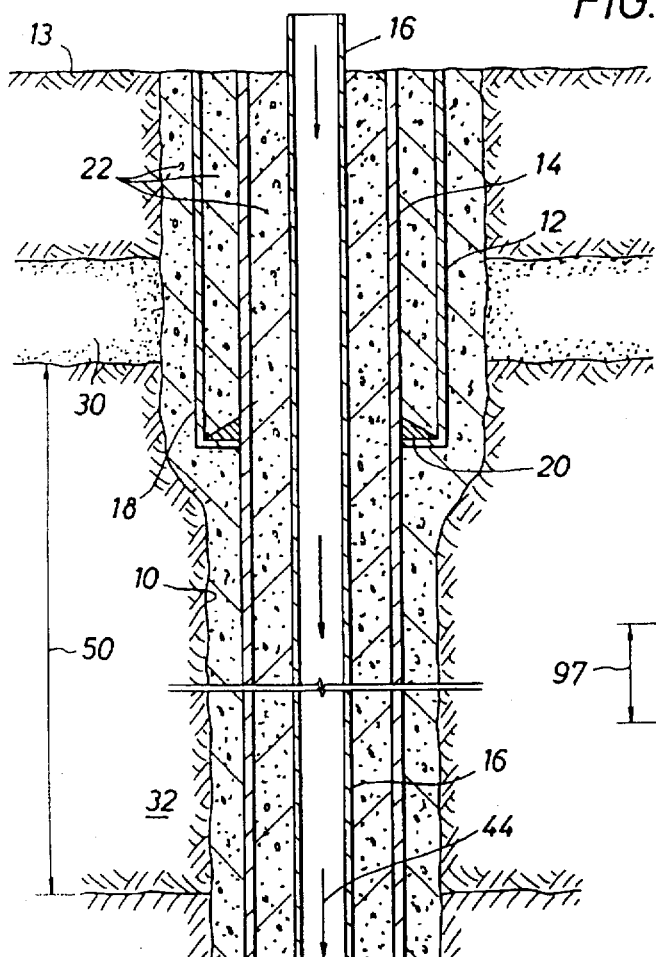
FIG. 1 illustrates a typical injection well which penetrates an USDW, an impermeable shale and the injection formation.

Attention is first drawn to FIG. 1 which illustrates a typical injection well. This typical well is provided easy illustration of the context and is an example of wells in construction, and also well location in the formations is given. The borehole 10 extends from the surface of the earth 13 through an USDW 30, an impermeable shale zone 32 and into the injection formation 36. Slurry, depicted by the arrows 44, is injected from the surface through a tubular member 16 which is preferably production tubing. Extending from the surface 13 through the aquifer 30 are two additional strings of tubulars 14 and 12 whose longitudinal axes are essentially coincident with the axis of tubing 16. These tubulars are preferably standard steel casings used in the completion of oil and gas wells. The casing 12 terminates below the lowest vertical extent of the USDW 30 at the casing shoe 20. Cement 22 fills all tubular-borehole annuli where directed and to the extent needed by well construction or governmental decree. The USDW is, therefore, shielded from the flow of injected slurry by three strings of steel tubulars and cement. This arrangement is in compliance with current regulations for injection wells and insures an adequate vertical and radial hydraulic seal of the USDW. Tubing 16 and casing 14 extend through an impermeable shale whose vertical thickness 50 is a minimum of 250 feet to meet current injection well specifications. Through the impermeable shale and down to the packer 34, the casing-borehole annuli are filled with cement 22, again to insure hydraulic sealing to protect the aquifer from any vertical fluid migration. The borehole 10 penetrates an injection formation denoted by the numeral 36. The shale 32 serves as an impermeable barrier between the injection formation 36 and the aquifer 30. Packer 34 is positioned at or near the top of the injection formation. The casing 14 usually extends through the injection formation while the tubing 16 terminates in the vicinity of the lower boundary of the injection formation. Cement 22 fills the casing/borehole annulus in this region of the well. A cement plug 40 or other suitable bridging mechanism is positioned within the casing string 14 at the lower boundary of injection zone 36. Perforations are made in the casing 14 and the cement sheath (assumed to be fully along the casing in this example) thereby establishing fluid communication between the tubing 16 and the injection formation 36. Perforations are preferably made near the lower boundary of the injection interval. Should these perforations become blocked or clogged over time by the injection of waste slurries, new perforations can be made above the blocked perforations thereby maintaining a suitable flow path between the injection tubing and the injection formation.

Characteristics of the injection formation will next be examined. The formation is preferably high porosity with a high permeability in order to accept the injected slurries with minimal resistance. This allows low surface injection pressures which is a novel and notable feature of the invention as discussed previously. Formations at least partially depleted of their virgin fluids (if any) are also desirable in that they tend to readily accept injected fluid. It is highly desirable that the formation be subpressured as will be discussed in a subsequent section. It is preferable that the formation dip in angle with respect to the horizontal as shown in FIG. 1 or be of considerable thickness to facilitate gravity drainage/segregation of the injected fluid and solids. In certain instances, the injection formation might exhibit little or no dip at the point of penetration of the borehole, but dip significantly at distances radially removed from the borehole. An example would be an injection well drilled near the top of a geologic protrusion such as a salt dome. An example will be given in FIG. 5. It is extremely important that a large fraction of the effective porosity of the formation be in the form of fissures, interstitial rubble or natural fractures as designated by the numeral 38. Such formations are quite commonly found on the flanks of salt domes or any other type of geological protrusion or up thrust. Cap rocks usually associated with these types of geological features provide the required impermeable barrier above the injection formation. Again, the combination of a dipping formation, subpressured formation, and a well developed system of interconnected fractures (e.g., secondary porosity from the vugular regions and naturally occurring internal fractures) minimize the resistance of the injection formation to the injected slurry thereby minimizing required surface injection pressures. The slurry, being weighted as mentioned previously, tends to flow primarily down dip under the influence of gravity and the hydrostatic pressure head of the slurry column. This flow is in the desired direction in that it is away from the USDW 30 located up hole. Geological studies have indicated that several reservoirs can accommodate on the order of 50 million barrels of waste slurry from a single injection well.

To summarize the function of the injection well depicted in FIG. 1, slurry is pumped from the surface of the earth 13 through tubing 16 into a region of the casing 14 isolated by the packer 34 and the cement plug 40. The injected fluid exits the borehole through perforations 46 and flows into the fractured injection formation 36. The formation 36 may be tilted or not, sometimes it is relatively thick even though it is more or less horizontal. The path of flow within the injection zone occurs primarily within the fracture or vugular system 38 and the flow is down dip as illustrated by the arrows 48.

As an alternate embodiment (not shown), the injection well can be cased and cemented from the surface to the top of the injection zone. This form of open hole completion is possible in highly consolidated, vertically fractured injection formations. Other formations may have open hole wells. Since the injection formation is not cased and cemented, perforations are not needed to establish hydraulic communication between the injection zone and the surface of the earth.

The functional relationships between the surface elements of the invention, the injection well and the injection formation are illustrated in FIG. 2. The waste slurry, designated by the numeral 70, enters the system at input 74. The water component of the waste can be salt water or fresh water. Waste slurry can be delivered to the disposal site by barge, boat, truck, pipeline or any other operationally and economically feasible means. Certain preprocessing steps are then performed at the block designated as 72. These preprocessing steps include adding of the viscosifier and weighting agent, screening of particulates and other steps which have been mentioned previously and will be discussed in detail in a following section. Once preprocessing has been completed, the waste slurry exits at output 76 and enters a holding tank. At this point, the waste 70 comprises a slurry of liquid and suspended solid particulate material and has been preprocessed to meet all operational and regulatory requirements. It should also be noted that the slurry is at atmospheric pressure. The slurry is then pumped from the holding tank 70 through fitting 71 into tubing 16 within the injection well. The pressure requirements of the pump are not stringent since the slurry has been weighted and it is being pumped with an adequate pressure head into a highly fractured, dipping injection formation 36. As before, other injection zones may have secondary porosity with minimal dip but greater formation thickness. Pumps generating surface pressures of 200 psi or less have been found sufficient to maintain a reasonable disposal rate in suitable injection formations. By contrast, conventional injection requires a much higher MASIP. In some situations where the injection formation is underpressured and/or the slurry is weighted (it has sufficient hydrostatic head), the slurry requires no pumping and flows "on vacuum" into the injection formation by means of a siphoning effect driven by the hydrostatic head of the slurry column. That is, if the pump 62 is shut off and the valve 66 in pump bypass line 64 is opened, the waste 70 will flow from tank 60 into the dipping injection formation 36 as depicted by arrows 48.

Attention is now directed toward the preprocessing steps, each of which will be discussed in detail. The preprocessing steps are shown in block diagram in FIG. 3. There is some flexibility in the sequence of the steps. The sequence depicted in FIG. 3 is selected for purposes of discussion only.

In the previous example of waste material consisting of nonhazardous oilfield waste (NOW) and naturally occurring radioactive material (NORM), it was mentioned that essentially all earth material contains some background level of naturally occurring radioactivity which include isotopes which emit alpha and beta particles as well as gamma radiation. Generally speaking, material classified as NOW are considered "non-radioactive" in the sense that their level of naturally occurring radioactivity is below a regulated level. Current regulations classify any material with equivalent radium-226 specific activity below 30 pico Curies per gram of sample in the NOW category. Regulatory amounts may change to other values without departing from the described invention. Current regulations also allow NOW material to be disposed in injection wells of the type described in the previous paragraphs. Any waste material received for injection disposal must be monitored to determine if it is classified as NORM or NOW material. If the waste has a radioactive level that exceeds the regulatory limit at which NOW becomes NORM, dilution may be required before disposal into some wells. This step is shown at block 80 of FIG. 3. The diluent might be liquid such as brine or other available waste from drilling or production operations. Alternately, the addition of viscosifier and weighting material might suffice to bring the waste within the NOW category if the order of the steps of FIG. 3 are rearranged. It should be noted that the 30 pico Curie level is a regulatory limit. This limit is subject to change, and injection wells with unregulated or unlimited radioactivity restrictions might be permitted. Further, other waste streams (with particles, or subject to grinding, can be added so that the flow into the formation for disposal is securely put out of harm's way.

Excessive concentrations of grease or oil are removed from the waste prior to injection for environmental and possible economic reasons. This process is shown at block 82 of FIG. 3. One method of removal is gravity separation using a commercially available gun barrel separator. If the concentration of oil in the waste is equal to or greater than 1 barrel per 2000 barrels of waste, skimming techniques are used to remove the oil constituent. It is possible that the value of the skimmed oil exceeds the cost of skimming thereby producing a byproduct of net economic value.

Although one of the novel features of the invention is the ability to inject solid particulate material along with the liquid phase of the waste, experience has shown that there are some limitations to the size of the particulates in order to achieve an efficient injection program. The waste may include relatively large particles of solid material such as "chunks" of drill bit cuttings. Although the maximum size of particle that can be injected is a function of many factors including the fracture system of the injection zone, experience has shown that particles up to 2–5 millimeters in diameter can be effectively injected in most operations. The incoming waste is screened with, as an example, a 10 mesh screen as shown generally at block 84 of FIG. 3. Particles which do not pass through the screen are diverted to a grinding or shearing system to reduce their size as illustrated at block 88. Such means might be a sand pump or other suitable grinding apparatus. The ground particles are then reintroduced to the main stream of the preprocessing operation at block 84 for a second screening. The screening operation 84 and particle reduction operation 88 are repeated until the particulate material is reduced to or below the predetermined size. It should again be noted that the 10 mesh size specification is rather arbitrary and dependent upon many factors including the fracture system of the injection reservoir. Particulates as large as sand have been successfully suspended and injected, as well as shale cuttings as large as 5 millimeters in diameter.

Figure 4:
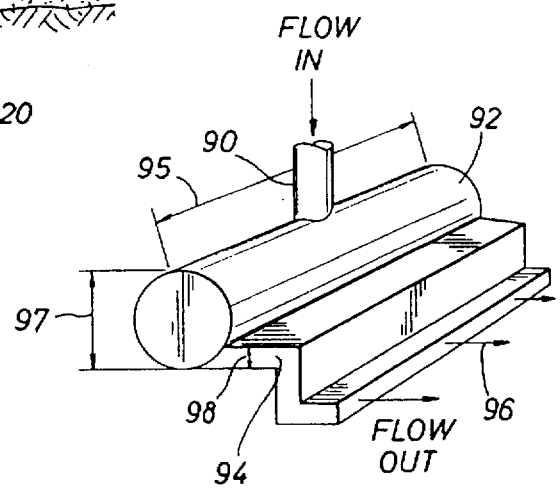
FIG. 4 illustrates a reduced feed flow manifold sometimes used in the preprocessing of the slurry prior to injection.

It is sometimes advantageous to reduce the flow pressure of the slurry during the screening operation 84. This is accomplished in the preferred embodiment of the invention by using a reduced flow feed manifold depicted in FIG. 4. Slurry flows into the manifold through input line 90 and first enters and partially fills an essentially cylindrical portion of the manifold identified by the numeral 92. For a four inch input flow line 90, the dimension identified by the arrow 97 is preferably about ten inches and the dimension identified by the arrow 95 is approximately four feet. The effective cross section of the flow is significantly increased by the cylindrical portion 92 of the manifold thereby reducing the flow pressure. Slurry flows from the cylindrical portion of the manifold through a slightly constricting conduit 94 with a rectangular cross section. The dimension identified by the numeral 98 is approximately one inch or less. The slurry exits the reduced flow feed manifold as depicted by the arrows 96 and flows to the previously described screening operation.

Viscosifiers and possibly weighting material is added to the waste stream at block 86 of FIG. 2. A possible viscosifier is virgin bentonite which is a clay mineral with a specific gravity of approximately 2.7. Since the specific gravity of the viscosifier is relatively large, it may also serve as a weighting agent. It is desirable to bring the viscosity of the waste stream to a funnel viscosity in a selected range of up to about 90 seconds per quart for efficient operation. At this viscosity and with particulates in the ideal size range of 2 millimeters in diameter or less (10 mesh sieve), a slurry containing 15 to 35% solids can be obtained and successfully injected. Barite (barium sulfate) with a specific gravity of over 4 can be used as an independent weighting agent.

The amount of material added for the sole purpose of weighting the slurry is, of course, a function of the amount of waste particulates in the slurry. It has been found that a slurry weight of 10 lbs/gal or more is beneficial for most injection operations. By reducing pump pressure and power, but using a heavier slurry (one that is denser, injection efficiency is improved and flow increases into the formation. This reduces surface pressure to help assure operation below the formation fracture pressure.

A second embodiment of the invention involves the use of waste material from other NOW waste processing operations in place of virgin clays as a viscosifier and weighting material. A surface processing method for NOW material, offered commercially by the assignee of the current invention, generates a material that is very high in clay content and would be very useful as a viscosifier and a weighting agent in the present invention. That is, recycled material from one type of processing could be used in the disposal technique of the present invention thereby eliminating the need to use any virgin material. This is both environmentally and economically desirable as no additional volume of NOW is created.

In most operations, it has been found that the pH of most preprocessed slurry falls within the range of 6 to 8. If, for any reason, the preprocessed material is sufficiently corrosive to cause damage to the processing or injection apparatus or even to the injection formation, the pH can be adjusted in the preprocessing steps preferably after step 86.

The preprocessed waste is output at the point indicated schematically by the numeral 76 and passed to pump 62 for injection into the injection zone.

There are specific advantages to disposal into a subpressured zone. The subpressured condition tends to exist due to compartmentalization and isolation of the zone due to uplifting and descending during geologic time which suggests that faults existing, and in fact, contributing to the zonal isolation are well sealed and are not conduits for migration of injected fluids. If these seals have existed in such a geologic setting, it is unlikely that they can be broken unless a significant pressure differential can be applied to them at a particular spot. The rapid transient pressure dissipation in an underpressured, highly permeable and highly porous zone decreases the chance that a pressure differential would develop that could overcome existing zonal contaminant or confining pressures in the strata above. These factors limit the likelihood that any containment can migrate toward a USDW located above.

Figure 5:
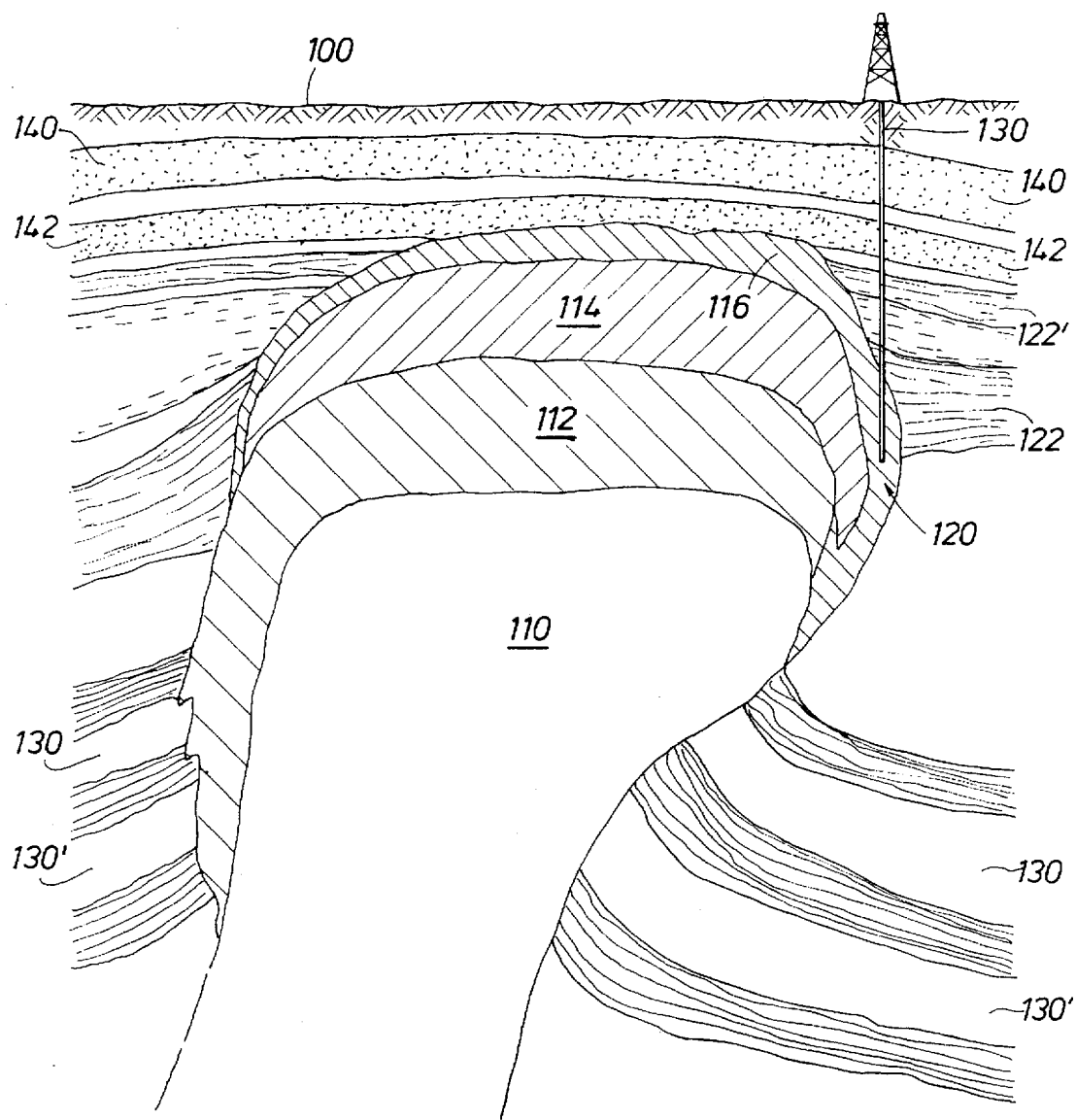
FIG. 5 illustrates a desirable injection formation which is found on the flank of a salt dome.

Attention is directed to FIG. 5 which shows a disposal well borehole 130 drilled on the flank of a salt stock extrusion 110. The well reaches total depth in an injection zone which is the upper layer 116 of the salt dome cap rock in a highly rubbleized area, indicated in general by the numeral 120, as it rolls off the edge of the dome and down the flank. Such a zone is typically described as "highly vugular" and "cavernous" in geological studies and is significantly subpressured relative to the strata above. The injection zone 120 is bounded by fractures against the flank of the lower cap rock layers 114 and 112 and salt 110 along one side, and well sealed by later deposition 122 of shale which contributes to the sealing of fractures along with probable solution deposition during fracture formation. In addition, 150 to 800 feet of additional shale 122 and 122' exist above the cap rock in the area 120 of injection. Not only does this shale provide a barrier for upward fluid migration, but it shows that the depositional environment is such that sealing of fractures or other possible conduits for upstructure flow is most probable, as borne out by the isolated subpressured zone.

Still referring to FIG. 5, the rubbleized portion of 120 of the caprock extends downwardly through a breccia zone along the flank of the dome where it is impacted by deep sands 130 and 130' typically of the Miocene age. As such, liquids injected or flowed from the surface of the earth 100 through the borehole 130 into the injection zone 120 are believed to travel down through the high permeability zones to the Miocene sands 130 and 130' where a "leak-off" scenario occurs through a native sand filter. While the zone 120 remains underpressured, the hydraulic head associated with the change in depth along the flank suggests that the leak-off of what is essentially clean, filtered brine into the aquifers of the Miocene sands 130 and 130' can and will occur. This is a scenario documented in prior art salt dome disposal operations focusing on brine disposal in which leak-off rates were stabilized for a given injection pressure in providing a description of an injection zone "volume" that was nearly unlimited.

Attention is now directed to the dissipation of the solid phase of the slurry. Again referring to FIG. 5, injected solids, suspended in a slurry, can be expected to be transported and carried over the edge of the salt dome structure until they are filtered or fall out of the flow stream and accumulate along the flank. They provide an additional and developing "sand" filter for the liquid flowing into the Miocene sands 130 and 130'. One advantage of this is that waste solids are transported away from the borehole 130 such that injectivity is not compromised, at least in the short term. Another significant advantage is that this places the solid waste at a deeper depth and gravity segregates them from upper liquid zones such as a USDW 140 and a slightly saline aquifer 142. As such, even if there were some cataclysmic failure in the upper seal of the selected disposal zone 120, the solid wastes injected, with densities far greater that water, are not readily available to be transported upwards as contaminants. Leakage, if it were to occur, would take place only at the upper levels and would be dominated by the more mobile and lower density liquid phase of the injected slurry, which would be predominantly water.

As an aside, FIG. 5 shows a salt dome distorting strata of the earth at various depths. In the distorted strata, the formations have significant depth from the borehole delivering waste flow into the formation to lower areas of the formation. Indeed, the formation can dip several hundred feet, or the formation can be several hundred feet thick. In this alternative, the horizontal orientation or dip is less significant where the formation is thicker. Whether thin or thick, the formation is able to receive and store a very large quantity of waste. So to speak, waste added over time will flow down hill toward lower areas so that flow keeps the area near the injection well clear. The flow velocity and volumetric accumulation vary with many factors. In addition to the salt dome, highly vugular carbonate reef structures define similar storage formations.

While the methods and apparatus herein described constitute the preferred embodiment of this invention, it is to be understood that the invention is not limited to these precise methods and forms of apparatus and that changes may be made therein without departing from the scope of the invention.

What is claimed is:

1. A method for disposing solid materials in a liquid in a subterranean injection formation comprising:
   (a) locating a subterranean injection formation overlaid by a formation of impervious material, wherein the injection formation extends from a certain depth to a greater depth;
   (b) penetrating said subterranean injection formation with a borehole;
   (c) mixing at the surface of the earth a solid material in a liquid to thereby form a slurry;
   (d) transferring said slurry from the surface of the earth through said borehole into said injection formation; and
   (e) wherein slurry pressure at the surface is reduced so that pressure of the slurry in the formation is less than formation fracture pressure.

2. The method of claim 1 wherein said slurry is transferred from the surface of the earth through said borehole to said injection formation by pumping at a low injection pressure of 200 p.s.i. or less.

3. The method of claim 1 including the preliminary step of selecting and separating particles of the solid material above a predetermined size from the remainder of the solid materials;
   (a) grinding the separated larger particles to a size smaller than said predetermined maximum size;
   (b) mixing the separated particles with the slurry; and
   (c) then injecting the slurry into the injection formation.

4. The method of claim 3 wherein the step of separation is done by screening.

5. The method of claim 4 wherein the pressure of the slurry is reduced prior to screening.

6. The method of claim 1 wherein a bentonite of high specific gravity is added to the slurry as a combination viscosifier and weighting agent.

7. The method of claim 1 wherein the step of locating the injection formation includes drilling the borehole adjacent to a salt dome to intercept a formation exhibiting high porosity and permeability around the salt dome and said formation extends downwardly and away from the salt dome, and said selected formation is separated and isolated by formations thereabove so that said injection formation does not communicate with any fresh water formation above said injection formation.

8. The method of claim 7 including the step of directing the borehole into the injection formation at a location wherein the formation exhibits sufficient transmissibility so that natural flow occurs at pressures lower than the injection formation pressure, and wherein the pressure is sufficiently low that further fracture of the injection formation does not occur.

9. The method of claim 8 wherein the injection formation is selected based on formation capacity at the portions thereof located at the greater depth.

10. The method of claim 9 including the step of adding NOW material to the slurry to dilute the slurry to a specified radiation level.

11. The method of claim 10 wherein additional NOW material is imported to the borehole area and is added to the slurry to reduce the concentrations of radioactive materials to a desired level.

12. The method of claim 10 wherein NOW material of high viscosity is imported to the borehole and is added to the slurry.

13. The method of claim 10 wherein the slurry includes oil or grease, and including the step of skimming prior to the injection of the slurry into the injection formation.

14. The method of claim 13 wherein the injection formation is subpressured with respect to the existing hydrostatic gradient prior to injection.

15. The method of claim 10 wherein weighting agents are added to raise the specific gravity of the slurry to lessen the pump pressure needed to pump the slurry from the surface of the earth into the injection formation.

16. The method of claim 15 wherein the borehole is sealed against earth formations; and the injection pressure is reduced to reduce the risk of damaging hydraulic seals of the well, and avoid inducing fracturing within the formation.

17. The method of claim 16 wherein the injection well borehole is cased and cemented to the top of the injection formation.

18. The method of claim 17 wherein the pH of the slurry is controlled within an acceptable range by adjustment prior to the injection step.

19. The method of claim 1 wherein gelling and viscosifying agents are added to the slurry as a combination viscosifier and weighting agent.

20. A method for disposing solid materials in a liquid in a subterranean injection formation comprising:
 (a) locating a subterranean injection formation overlaid by a formation of impervious material, wherein the injection formation extends from a certain depth to a greater depth;
 (b) penetrating said subterranean injection formation with a borehole;
 (c) mixing at the surface of the earth a solid material in a liquid to thereby form a slurry;
 (d) transferring said slurry from the surface of the earth through said borehole into said injection formation; and
 (e) wherein the step of locating the injection formation includes drilling the borehole adjacent to a salt dome to intercept a formation exhibiting high porosity and permeability around the salt dome and said formation extends downwardly and away from the salt dome, and said selected formation is separated and isolated by formations thereabove so that said injection formation does not communicate with any fresh water formation above said injection formation.

21. The method of claim 20 wherein said slurry is transferred from the surface of the earth through said borehole to said injection formation by pumping and the formation injection pressure is less than formation fracture pressure.

22. The method of claim 20 including the preliminary step of selecting and separating particles of the solid material above a predetermined size from the remainder of the solid materials;
 (a) grinding the separated larger particles to a size smaller than said predetermined maximum size;
 (b) mixing the separated particles with the slurry; and
 (c) then injecting the slurry into the injection formation.

23. The method of claim 22 wherein the step of separation is done by screening.

24. The method of claim 23 wherein the pressure of the slurry is reduced prior to screening.

25. The method of claim 20 wherein a bentonite of high specific gravity is added to the slurry as a combination viscosifier and weighting agent.

26. The method of claim 20 including the step of directing the borehole into the injection formation at a location wherein the formation exhibits sufficient transmissibility so that natural flow occurs at pressures lower than the injection formation pressure, and wherein the pressure is sufficiently low that further fracture of the injection formation does not occur.

27. The method of claim 26 wherein the injection formation is selected based on formation capacity at the portions thereof located at the greater depth.

28. The method of claim 27 including the step of adding NOW material to the slurry to dilute the slurry to a specified radiation level.

29. The method of claim 28 wherein additional NOW material is imported to the borehole area and is added to the slurry to reduce the concentrations of radioactive materials to a desired level.

30. The method of claim 28 wherein NOW material of high viscosity is imported to the borehole and is added to the slurry.

31. The method of claim 29 wherein the slurry includes oil or grease, and including the step of skimming prior to the injection of the slurry into the injection formation.

32. The method of claim 29 wherein the injection formation is subpressured with respect to the existing hydrostatic gradient prior to injection.

33. The method of claim 29 wherein weighting agents are added to raise the specific gravity of the slurry to lessen the pump pressure needed to pump the slurry from the surface of the earth into the injection formation.

34. The method of claim 33 wherein the borehole is sealed against earth formations; and the injection pressure is reduced to reduce the risk of damaging hydraulic seals of the well, and avoid inducing fracturing within the formation.

35. The method of claim 34 wherein the injection well borehole is cased and cemented to the top of the injection formation.

36. The method of claim 35 wherein the pH of the slurry is controlled within an acceptable range by adjustment prior to the injection step.

37. The method of claim 20 wherein gelling and viscosifying agents are added to the slurry as a combination viscosifier and weighting agent.

38. A method for disposing of waste materials in a liquid in a subterranean injection formation comprising:
 (a) locating a subterranean injection formation overlaid by a formation of impervious material, wherein the injection formation extends from a certain depth to a greater depth;
 (b) penetrating said subterranean injection formation with a borehole;
 (c) directing from the surface of the earth a waste material liquid stream into the borehole;
 (d) flowing the waste material stream from the surface of the earth through said borehole into said injection formation;
 (e) controlling the waste material stream pressure at the surface so that pressure at the injection formation is less than formation fracture pressure; and
 (f) continuing flow of the waste material stream into the formation to enable disposal.

39. The method of claim 38 wherein said waste material stream is transferred from the surface of the earth through said borehole to said injection formation by pumping and the formation injection pressure is less than formation fracture pressure.

40. The method of claim 20 including the preliminary step of selecting and separating particles of a solid material above a predetermined size from smaller solid materials;
 (a) grinding the separated larger particles to a size smaller than said predetermined maximum size;
 (b) mixing the separated particles with the waste material stream; and
 (c) then injecting the waste material stream into the injection formation.

41. The method of claim 40 wherein a bentonite of high specific gravity is added to the waste material stream as a combination viscosifier and weighting agent.

42. The method of claim 38 including the step of directing the borehole into the injection formation at a location wherein the formation exhibits sufficient transmissibility so that natural flow of the waste material stream occurs at pressures lower than the injection formation pressure, and wherein the pressure is sufficiently low that waste material stream induced fracture of the injection formation does not occur.

43. The method of claim 38 wherein the waste material stream including oil or grease is skimmed prior to injection.

44. The method of claim 38 wherein weighting agents are added to raise the specific gravity of the waste material stream and reducing the pump pressure at the surface to pump the waste material stream from the surface of the earth into the injection formation.

45. The method of claim 38 wherein the waste material stream includes radioactive materials.

46. The method of claim 38 wherein the waste material stream includes suspended solids in waste liquid.

47. The method of claim 38 wherein the waste material stream includes materials from a waste pit or pond mixed therein.

48. The method of claim 38 wherein the waste material stream includes dissolved salts in a liquid phase.

49. The method of claim 38 wherein the waste material stream includes bacterial waste materials in a liquid phase.

50. The method of claim 38 wherein the waste material stream includes industrial waste materials in a liquid phase.

* * * * *